(12) United States Patent
Joliff et al.

(10) Patent No.: US 7,716,907 B2
(45) Date of Patent: May 18, 2010

(54) HEIGHT OF CUT ADJUSTMENT MECHANISM FOR ROTARY CUTTING DECK

(75) Inventors: Brian M. Joliff, Raleigh, NC (US); David L. Phillips, Willow Springs, NC (US); Jennifer L. Jaramillo, Apex, NC (US); Ronald L. Reichen, Raleigh, NC (US); Todd A. Link, Apex, NC (US); Scott A. Jarman, Fuquay-Varina, NC (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/192,435

(22) Filed: Aug. 15, 2008

(65) Prior Publication Data
US 2010/0037578 A1 Feb. 18, 2010

(51) Int. Cl.
*A01D 34/00* (2006.01)
(52) U.S. Cl. .......................... 56/17.2; 56/17.1
(58) Field of Classification Search ................ 56/17.1, 56/17.2, 320.1
See application file for complete search history.

(56) References Cited

U.S. PATENT DOCUMENTS

| 3,421,776 | A |   | 1/1969  | McCoy et al.     |         |
|-----------|---|---|---------|------------------|---------|
| 3,649,828 | A |   | 3/1972  | Price            |         |
| 3,872,654 | A | * | 3/1975  | Brundage et al.  | 56/13.1 |
| 4,321,785 | A | * | 3/1982  | Kaland           | 56/17.2 |
| 5,065,568 | A |   | 11/1991 | Braun et al.     |         |
| 5,085,044 | A |   | 2/1992  | Freier, Jr. et al.|        |
| 5,142,850 | A |   | 9/1992  | Patterson et al. |         |
| 5,381,648 | A |   | 1/1995  | Seegert et al.   |         |
| 5,749,209 | A | * | 5/1998  | Thomason         | 56/17.2 |
| 5,797,252 | A |   | 8/1998  | Goman            |         |

(Continued)

FOREIGN PATENT DOCUMENTS

CA 919726 1/1973

(Continued)

OTHER PUBLICATIONS

Jacobsen A Textron Company. "Trim Mowers." Jacobsen A Textron Company When Performance Matters, May 2008 Brouchure. [online]. [retrieved on Aug. 14, 2008]. Retrieved from the Internet:<URL:http://www.jacobsen.com/products/pdf/brouchures/Trim_Mowers.pdf>.

(Continued)

*Primary Examiner*—Alicia M Torres

(57) ABSTRACT

A height of cut adjustment mechanism is provided for a rotary cutting deck mounted on a lift arm extending from a traction vehicle. The mechanism includes a front axle and a rear axle, at least one roller mounted on each axle, and a pair of height of cut arms extending from each axle to a pivot axis on the rotary cutting deck. A notch lock on each height of cut arm may be moved between a locked position in which the notch lock engages a notch plate at a desired cutting height, and an unlocked position in which the notch lock disengages the notch plate so that the height of cut arm can pivot with respect to the rotary cutting deck. A lever attached to each notch lock can be operated to move the notch lock between the locked and the unlocked positions.

9 Claims, 5 Drawing Sheets

U.S. PATENT DOCUMENTS

| | | | | |
|---|---|---|---|---|
| 5,845,471 | A | * 12/1998 | Seegert et al. | 56/17.2 |
| 6,041,584 | A | * 3/2000 | Hohnl | 56/17.2 |
| 6,336,311 | B1 | 1/2002 | Bednar | |
| 6,336,312 | B1 | 1/2002 | Bednar et al. | |
| 7,478,519 | B2 | * 1/2009 | Phillips | 56/15.9 |

FOREIGN PATENT DOCUMENTS

| | | |
|---|---|---|
| DE | 202004015965 | 12/2004 |
| EP | 1647176 | 4/2006 |
| GB | 2352956 | 2/2001 |

OTHER PUBLICATIONS

Jacobsen A Textron Company. "Rough Mowers." Jacobsen A Textron Company When Performance Matters. May 2008 Brouchure. [online]. [retrieved on Aug. 14, 2008]. Retrieved from the Internet:<URL:http://www.jacobsen.com/products/pdf/brochures/Rough_Rotary_Mowers.pdf>.

Jacobsen A Textron Company. "Rotary Mower Decks." Jacobsen A Textron Company When Performance Matters. Web Page. [online]. [retrieved on Aug. 14, 2008]. Retrieved from the Internet:<URL:http://www.jacobsen.com/products/rough_rotary_mowers/ar522>.

"Introducing the New Toro Groundsmaster 4500-D." Toro Advantage. Issue No. 4. Feb. 2002. [online]. [retrieved on Aug. 14, 2008]. Retrieved from the Internet:<URL:http://www.toro.com/golf/advantage/cm_ta_feb_2002.pdf>.

"Rough Justice—The History, Theory and Folly of Roughs." ausgolf. [online]. [retrieved on Aug. 14, 2008]. Retrieved from the Internet:<URL: http://www.ausgolf.com.au/rough-justice-by-dr-michael-j-hurdzan>.

O'Brien, Patrick M. "A Waste of Time, Save Money with this tip to reduce mowing!" [online], [retrieved on Aug. 14, 2008]. Retrieved from the Internet:<URL:http://turf.lib.msu.edu/1990s/1997/970919.pdf>.

* cited by examiner

HEIGHT OF CUT ADJUSTMENT MECHANISM FOR ROTARY CUTTING DECK

FIELD OF THE INVENTION

The present invention relates to a height of cut adjustment mechanism for a rotary cutting deck mounted on a lift arm extending from a traction vehicle, and specifically to a height of cut mechanism for rotary cutting decks used for mowing golf course roughs.

BACKGROUND OF THE INVENTION

Many new and existing golf courses have narrowed their fairways and expanded their rough areas on either side of the fairways. Roughs requires less care than fairways, so narrowing the fairways allows golf course operators to lower their maintenance costs. For example, irrigation requirements may be reduced if only the fairways are watered. If grasses in the roughs are allowed to grow longer, those non-irrigated areas are less brown. Trees and other aesthetic features may be located in the roughs, because roots and shade can inhibit turf growth in the fairways.

However, golf course roughs still must be maintained regularly using grass mowing machines that can mow the vegetation at an acceptable length and appearance. Equipment for mowing golf course roughs typically includes a traction vehicle carrying three or five rotary cutting decks, each rotary cutting deck mounted on the end of a lift arm extending from the traction vehicle. Carrying the rotary cutting decks with lift arms extending from the front or sides of the traction vehicle is necessary and desirable, instead of towing the rotary cutting decks behind the vehicle, because it is necessary for the mower to provide close trims next to trees, bunkers or other hazards. Each lift arm also may be used to move a rotary cutting deck between a mowing position and a transport position. The mounting devices also should allow for pitch (front to back pivoting) and yaw (side-to-side pivoting) of the rotary cutting decks.

Traction vehicles carrying rotary cutting decks may travel at speeds of 6 to 8 miles per hour when mowing golf course roughs. The traction vehicle's weight may be in excess of 2000 pounds. Each rotary cutting deck may be subject to shocks from impacts against the ground surface or objects during mowing. To withstand the rigorous mowing conditions, rotary cutting decks typically are made of thick sheet steel, such as 7 gage or 10 gage sheet steel. Each rotary cutting deck may have a diameter between about 18 inches and 27 inches, and weigh at least 120 pounds.

Golf course operators sometimes need to change the height of cut of rotary cutting decks on a rough mower. For example, the height of cut may need to be changed if the mower goes from an intermediate rough with a 1½ to 2 inch height of cut, to a full length rough with a 3 to 4 inch height of cut. The height of cut also may need to be changed if the machine is used to mow rough for tournaments where rough heights can be as long as 6 inches. Additionally, golf course operators may change the height of cut of a rotary cutting deck due to seasonal variations, shade conditions, or different types of grass or vegetation in different rough areas of a golf course.

For a grass mowing machine with multiple rotary cutting decks mounted on lift arms, a height of cut adjustment mechanism is needed that is rugged, reliable, relatively simple and inexpensive. A height of cut adjustment mechanism for rotary cutting decks on a rough mower is needed that can absorb shocks from impacts and provide good stability of each deck at specified cutting heights.

SUMMARY OF THE INVENTION

A height of cut adjustment mechanism for a rotary cutting deck mounted on a lift arm extending from a traction vehicle includes a front pair of height of cut arms and a rear pair of height of cut arms. Each pair of height of cut arms has an axle extending therebetween, and each height of cut arm is pivotable to a plurality of positions to support the mower deck at a plurality of different cutting heights. A notch lock on each height of cut arm may be moved between a locked position and an unlocked position at each cutting height. A lever may be used to push the notch lock from an unlocked position to a locked position or pull the notch lock from a locked position to an unlocked position. The height of cut adjustment mechanism is rugged, reliable, relatively simple and inexpensive. It may be used on rough mowers and can absorb shocks from impacts and provide good stability of each deck at specified cutting heights.

DESCRIPTION OF THE PREFERRED EMBODIMENT

Figure 1:
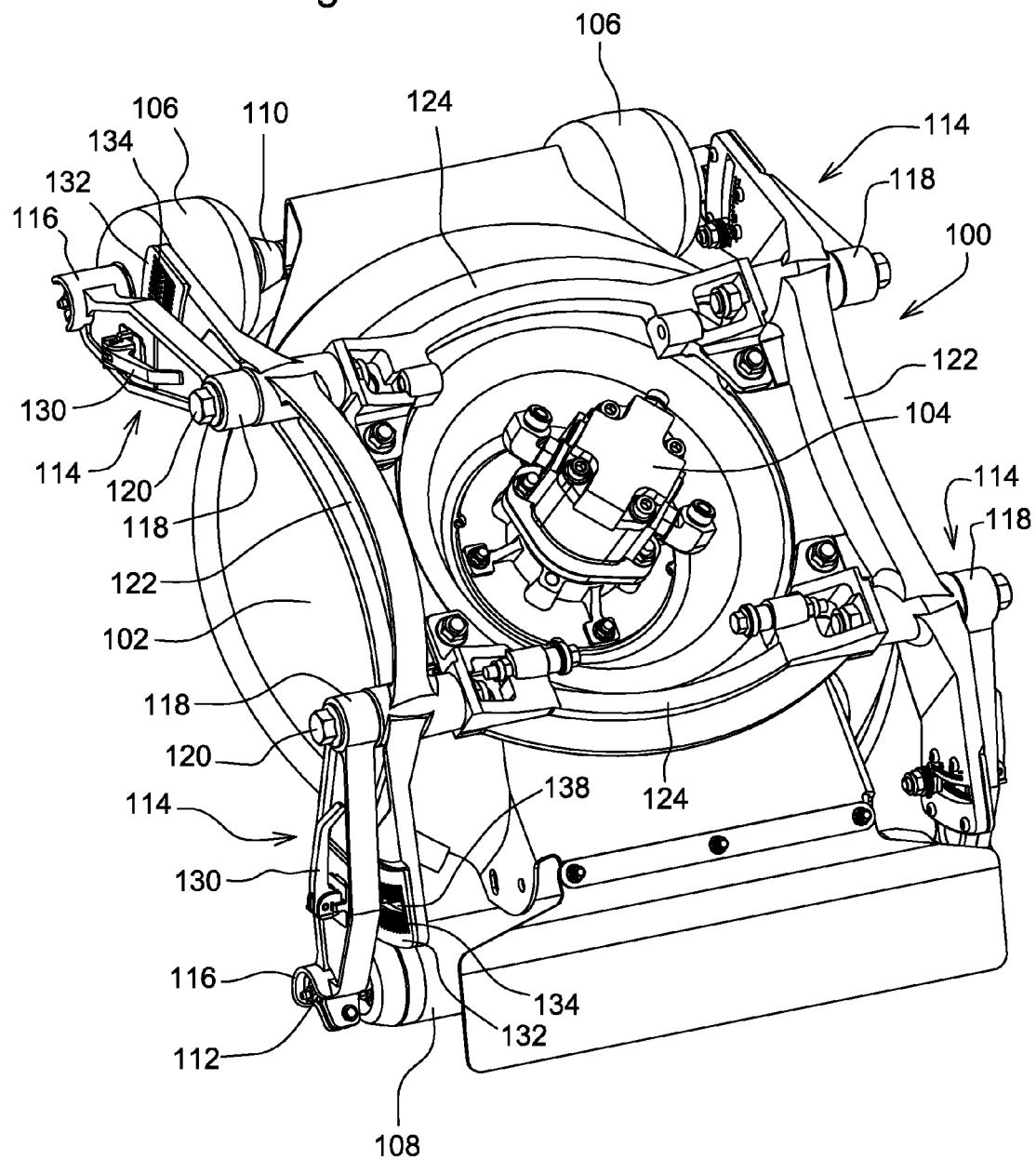
FIG. 1 is a perspective view of a rotary cutting deck with a height of cut adjustment mechanism according to a first embodiment of the invention.
Figure 2:
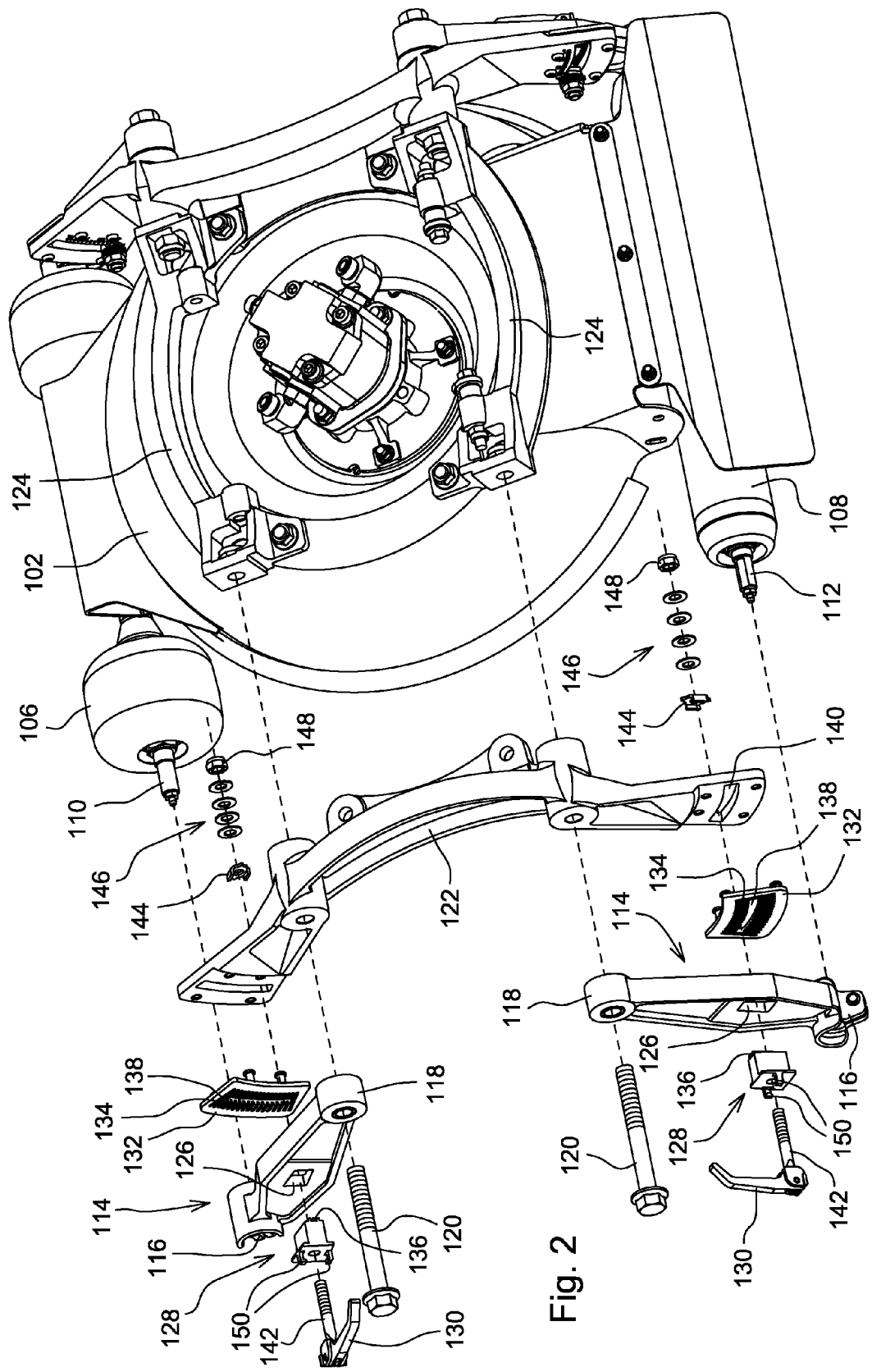
FIG. 2 is an exploded perspective view of a rotary cutting deck with a height of cut adjustment mechanism according to a first embodiment of the invention.
Figure 3:
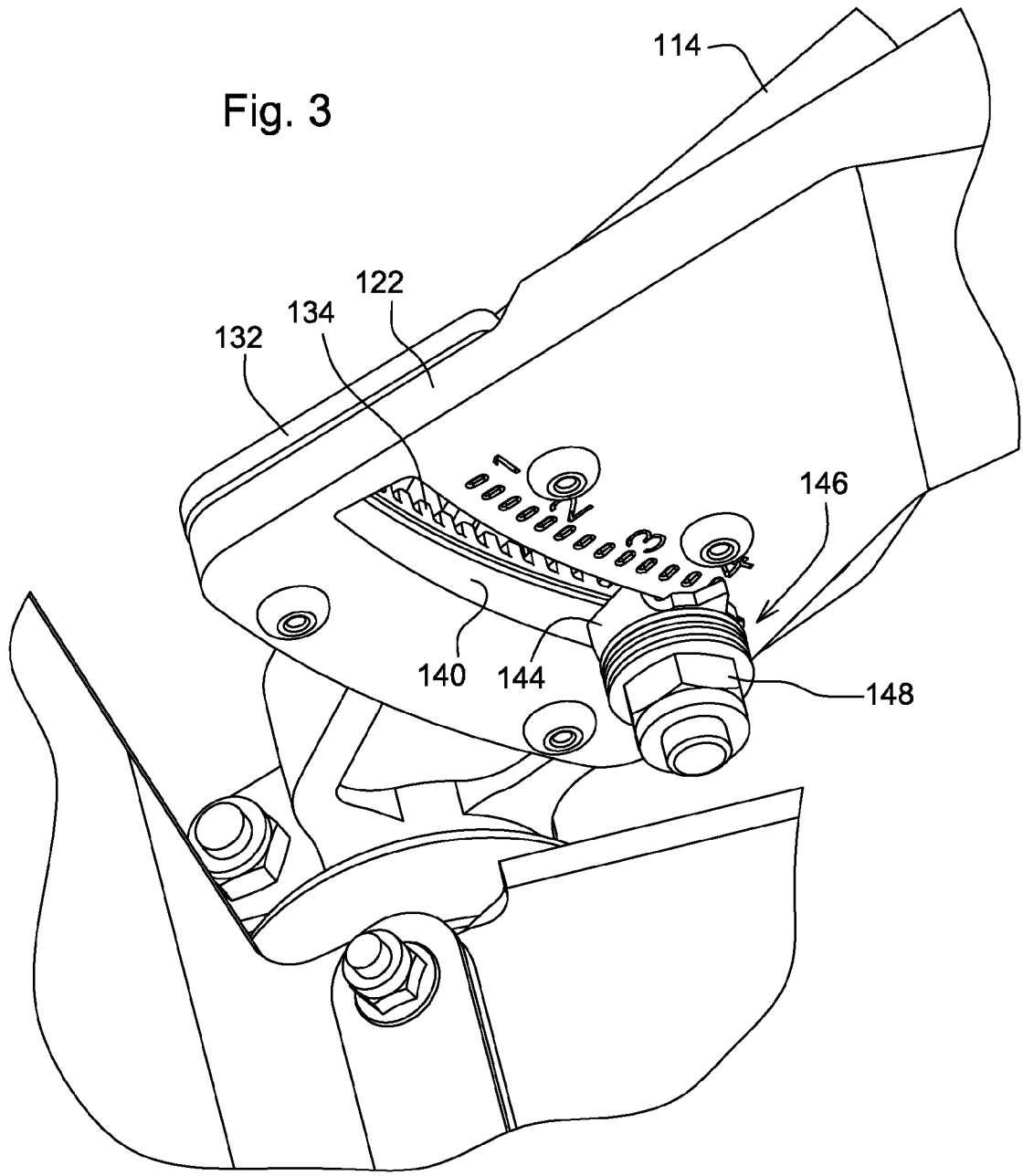
FIG. 3 is a perspective view of a height of cut adjustment mechanism according to a first embodiment of the invention.
Figure 4:
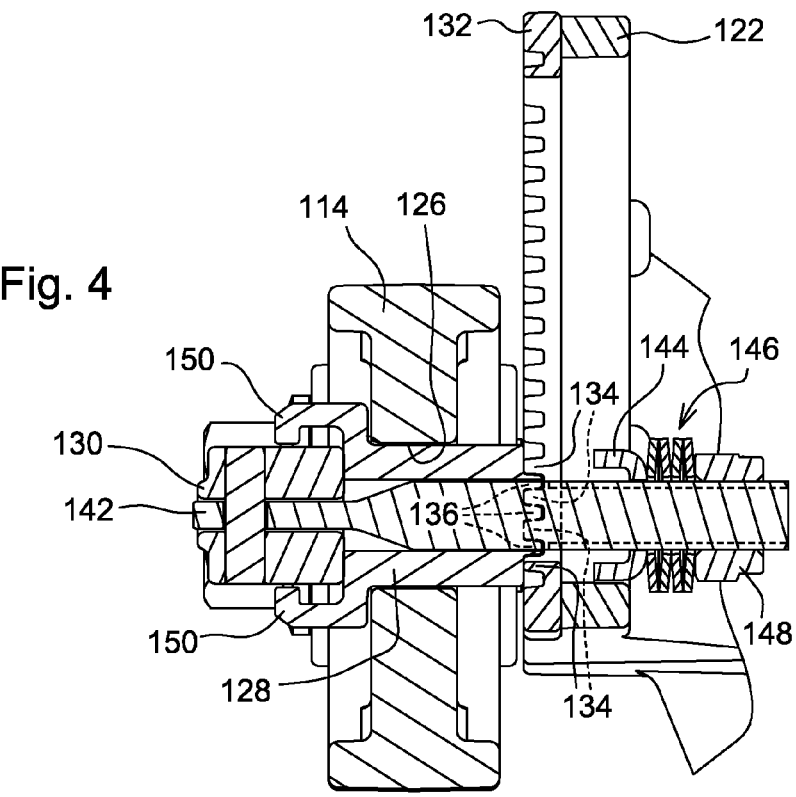
FIG. 4 is a cross section view of a height of cut adjustment mechanism in the locked position according to one embodiment of the present invention.
Figure 5:
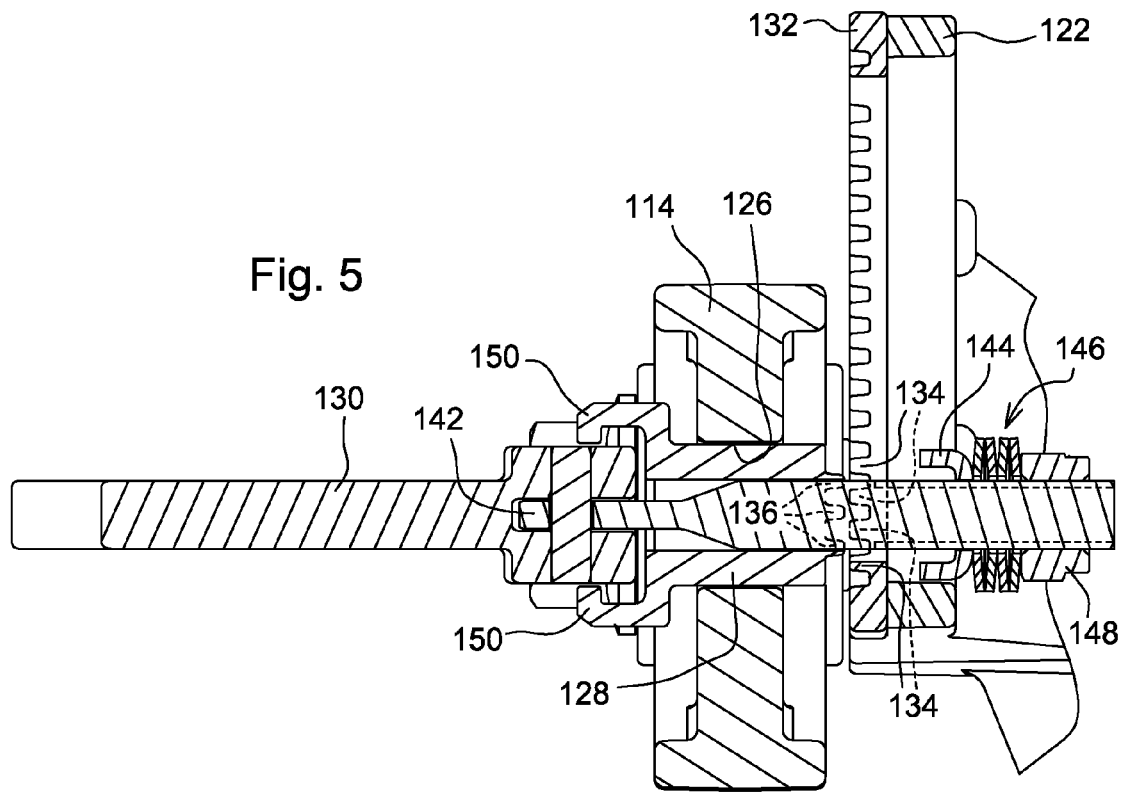
FIG. 5 is a cross section view of a height of cut adjustment mechanism in the unlocked position according to one embodiment of the present invention.

As shown in FIGS. 1 and 2, in a first embodiment, rotary cutting deck 100 may be carried by a traction vehicle for a rough mower. Each rotary cutting deck includes a circular inverted dish-shaped cutting chamber 102. A motor such as hydrostatic motor 104 may be mounted to the upper top surface of the rotary cutting deck. The motor turns a cutting blade attached to a generally vertically aligned spindle under the deck. The rotary cutting deck is supported over the ground surface by a front pair of rollers 106, casters or wheels, and a rear roller 108.

Figure 6:
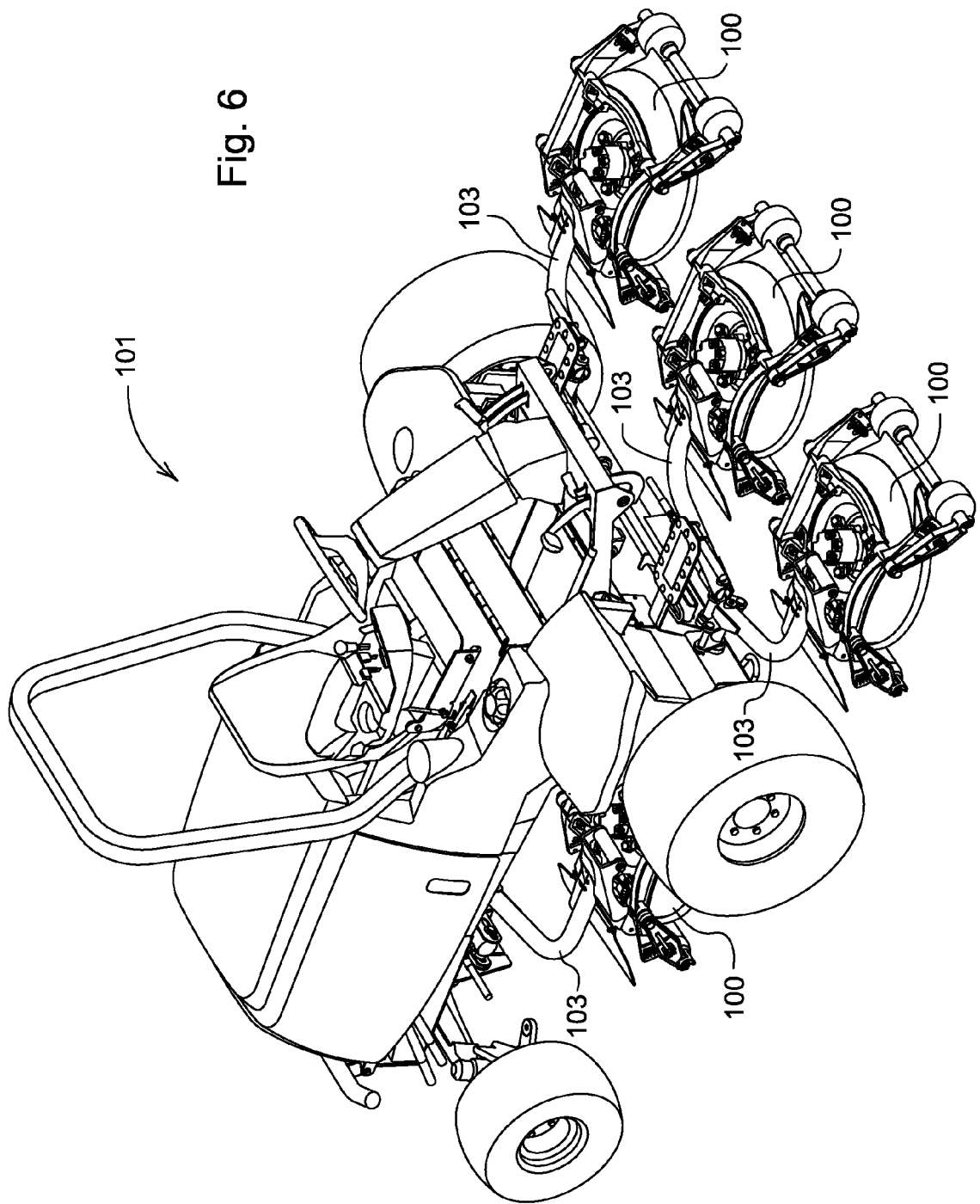
FIG. 6 is a perspective view of a rough mower having several rotary cutting decks mounted on lift arms extending from a traction vehicle, with height of cut adjustment mechanisms, in a preferred embodiment of the invention.

In one embodiment, as shown in FIG. 6, three or more rotary cutting decks may be mounted to the traction vehicle 101. Each rotary cutting deck may be pivotably supported at the end of a lift arm 103 which the operator may actuate with one or more hydraulic cylinders or electric lift mechanisms to raise or lower the rotary cutting decks between mowing positions and transport positions.

In one embodiment, one or more rollers, casters or wheels 106 are rotatably mounted to and supported by axle 110 at or near the front of the rotary cutting deck. One or more rear rollers 108 are rotatably mounted to and supported by internal shaft or axle 112 at or adjacent the rear of the rotary cutting deck. Alternatively, the rear of the rotary cutting deck may be supported by an axle with one or more casters or wheels.

In one embodiment, the height of cut adjustment mechanism of the present invention may be connected to the front and rear axles of the rotary cutting deck so that the mower deck can be raised or lowered to various different height of cut positions. The height of cut may be set by pivoting a front pair and a rear pair of height of cut arms 114 to specified positions and then locking the height of cut arms in place.

In one embodiment, each height of cut arm has a first or lower end 116 where the end of an axle is mounted. The front axle extends between the front pair of height of cut arms, and the rear axle extends between the rear pair of height of cut arms. Each of the pair of front arms should be pivoted to the same height of cut position, and each of the pair of rear arms also should be pivoted to a corresponding height of cut position so that the deck may have a slight forward rake during mowing, preferably with the front of the deck about ⅛ inch lower than the back.

In one embodiment, a second or upper end 118 of each height of cut arm is pivotably mounted to the rotary cutting deck. For example, a rod or threaded member 120 may be inserted through an opening in the second or upper end of the height of cut arm and then through a corresponding opening in height of cut support 122 mounted on the top surface of the deck. The rod provides a pivot axis for the height of cut arm. Height of cut support 122 may be mounted onto the top surface of the deck using threaded fasteners through a flange portion of the height of cut support and through cross members 124 that are secured to the top surface of the deck.

In one embodiment, each height of cut arm 114 may be a steel casting. Notch lock 128 may be positioned on or adjacent each height of cut arm. For example, notch lock 128 may be inserted into slot 126 or opening between the first and second ends of each height of cut arm. The notch lock, whether inserted into the slot or otherwise positioned on or adjacent the height of cut arm, is movable between a locked position to hold the height of cut arm at each desired cutting height, and an unlocked position allowing the height of cut arm to pivot with respect to the rotary cutting deck.

In one embodiment, lever 130 may engage the notch lock and move, shift or slide the notch lock between locked and unlocked positions. In the locked position, notch lock 128 may engage notch plate 132 at a desired height of cut, while in the unlocked position, notch lock 128 may disengage notch plate 132. Alternatively, instead of engaging a notch plate, each notch lock may engage a surface portion of the deck or height of cut support at each specified cutting height in the locked position.

In one embodiment, notch plate 132 may be secured to height of cut support 122 with rivets or other attachment means. The notch plate may have a series of regularly spaced grooves or teeth 134 which demarcate the various height of cut positions available. The notch lock may have corresponding grooves or teeth 136 that engage or grip the notch plate at each specified height of cut position.

In one embodiment, the grooves or teeth on the notch plate are aligned in rows perpendicular to an arcuate slot 138 through the notch plate. The arcuate slot in the notch plate may be aligned with a corresponding arcuate slot 140 in the height of cut support as the notch plate is secured to the height of cut support. The height of cut support may be an investment casting.

In one embodiment, rod or threaded member 142 is pivotably attached to lever 130. Rod 142 may be inserted through the notch lock and through the arcuate slots in the notch plate and height of cut support. Height of cut indicator 144 may be held on the end of rod 142 using a spring washer 146 and nut 148, urging the rod and notch lock toward the locked position.

The height of cut indicator may point to visible markings adjacent the slot of the height of cut support to show the actual height of cut position where the notch lock engages the notch plate.

In one embodiment, an operator may pivot lever 130 between a locked and an unlocked position. In the locked position, the lever cams to push the rod to compress the spring washer and maintain the notch lock in engagement with the notch lock plate at a specified height of cut position. In the unlocked position, the lever cams to pull the rod to decompress the spring washer so that the notch lock can disengage the notch lock plate. The notch lock may have a pair of ears 150 that a shoulder on the lever pulls outwardly when the lever is pivoted to the unlocked position. By pulling the notch lock outwardly by its ears, the lever urges the notch lock away from engagement with the notch plate.

In one embodiment, the height of cut arms may be identical for all of the front and rear positions of the rotary cutting deck. Each height of cut arm may be reversible so that the arm may be turned around and used in either front position or rear position, and still provide the rotary cutting deck with a forward rake. The reversible height of cut arm feature may be accomplished by locating the notch lock slot 140 in each height of cut arm slightly off center from the midpoint of the arm. The off center location allows the height of cut arms to be reversible, while the front of the rotary cutting deck may be positioned slightly lower than the rear of the deck, sometimes referred to as a forward rake.

In FIGS. 1-5, only one rotary cutting deck is shown. FIG. 6 shows traction vehicle 101 that carries multiple rotary cutting decks, each rotary cutting deck supported on a lift arm 103 extending from the vehicle. Each cutting deck may be raised and lowered by use of hydraulic controls that may be operated from the vehicle.

The invention provides a relatively simple and inexpensive mechanism for adjusting the height of cut of a rotary cutting deck mounted to a lift arm of a traction vehicle. The height of cut adjustment mechanism is rugged and provides for stabilization of the rotary cutting units at each specified cutting height.

Having described the preferred embodiment, it will become apparent that various modifications can be made without departing from the scope of the invention as defined in the accompanying claims.

The invention claimed is:

1. A height of cut adjustment mechanism for a rotary cutting deck mounted on a lift arm extending from a traction vehicle, comprising:

a front pair of height of cut arms and a rear pair of height of cut arms pivotally attached to the rotary cutting deck, each pair of height of cut arms having a ground engaging roller mounted therebetween, and each height of cut arm pivotable relative to the rotary cutting deck to a plurality of positions to support the mower deck at a plurality of different cutting heights;

a notch lock movable through a slot in each height of cut arm between a locked position and an unlocked position at each of the cutting heights; the notch lock having a plurality of teeth;

a height of cut support extending over the deck and between one of the front height of cut arms and one of the rear height of cut arms, and having a plate fastened to the height of cut support behind the slot in each height of cut arm; the plate having a plurality of teeth; and a lever to push the notch lock through the slot from the unlocked position to the locked position in which the teeth of the notch lock and the teeth of the plate engage each other, and to pull the notch lock through the slot from the locked position to the unlocked position in which the teeth disengage each other.

2. The height of cut adjustment mechanism of claim 1 further comprising a rod pivotably attached to the lever and extending through the notch lock.

3. The height of cut adjustment mechanism of claim 1 wherein the front pair of height of cut arms and the rear pair of height of cut arms provide the rotary cutting deck with a forward rake at each cutting height, and wherein each front height of cut arm is reversible with each rear height of cut arm.

4. A height of cut adjustment mechanism for a rotary cutting deck mounted on a lift arm extending from a traction vehicle, comprising:
   a pair of height of cut arms, each height of cut arm having a first lower end where a ground engaging roller is mounted, a second upper end pivotably mounted to a height of cut support attached to and extending over the rotary cutting deck, and a slot through each height of cut arm between the first and second ends; and
   a notch lock inserted into the slot and movable between a locked position extending through the slot to engage with a plate behind the slot and attached to the height of cut support for holding the height of cut arm at a desired cutting height, and an unlocked position disengaging the plate and allowing the height of cut arm to pivot with respect to the rotary cutting deck;
   a lever attached to each notch lock to move the notch lock between the locked position and the unlocked position;
   a rod extending from the lever through the notch lock, and a spring washer urging the rod into engagement with the plate in the locked position.

5. The height of cut adjustment mechanism of claim 4 further comprising a pair of ears on the notch lock that the lever pulls to move the notch lock from the locked position to the unlocked position.

6. A height of cut adjustment mechanism for a rotary cutting deck mounted on a lift arm extending from a traction vehicle, comprising:
   a pair of height of cut arms, each height of cut arm having a first lower end where a ground engaging roller is mounted, a second upper end pivotably mounted to a height of cut support attached to and extending over the rotary cutting deck, and a slot through each height of cut arm between the first and second ends; and
   a notch lock inserted into the slot and movable between a locked position extending through the slot to engage with a plate behind the slot and attached to the height of cut support for holding the height of cut arm at a desired cutting height, and an unlocked position disengaging the plate and allowing the height of cut arm to pivot with respect to the rotary cutting deck;
   wherein each of the notch lock and the notch plate have a plurality interengaging teeth.

7. A height of cut adjustment mechanism for a rotary cutting deck mounted on a lift arm extending from a traction vehicle, comprising:
   a front axle and a rear axle, at least one roller mounted on each axle, and a pair of height of cut arms extending from each axle to a pivot axis on a height of cut support attached to and extending over the rotary cutting deck;
   a notch lock in a slot through each height of cut arm and movable through the slot between a locked position in which the notch lock engages a plurality of teeth on a notch plate mounted to the height of cut support behind the slot at a desired cutting height, and an unlocked position in which the notch lock disengages the teeth on the notch plate so that the height of cut arm can pivot with respect to the rotary cutting deck; and
   a lever attached to each notch lock to move the notch lock between the locked and the unlocked positions.

8. The height of cut adjustment mechanism of claim 7 further comprising a rod extending from the lever through the notch lock.

9. The height of cut adjustment mechanism of claim 8 further comprising a height of cut indicator on the rod.

\* \* \* \* \*